United States Patent [19]

Kriessmann et al.

[11] Patent Number: 5,037,920

[45] Date of Patent: Aug. 6, 1991

[54] ACRYLATE COPOLYMER ADDITIVES FOR AQUEOUS CATIONIC COATING SYSTEMS

[75] Inventors: Ingo Kriessmann; Harald Rauch-Puntigam; Willibald Paar, all of Graz; Peter Morre, Feldkirchen, all of Austria

[73] Assignee: Vianova Kunstharz, A.G., Werndorf, Austria

[21] Appl. No.: 577,124

[22] Filed: Sep. 4, 1990

[30] Foreign Application Priority Data

Sep. 1, 1989 [AT] Austria .................................. 2061/89

[51] Int. Cl.$^5$ ........................................... C08F 220/34
[52] U.S. Cl. .................................................. 526/245
[58] Field of Search ................................. 526/245, 246

[56] References Cited

U.S. PATENT DOCUMENTS

| | | | |
|---|---|---|---|
| 3,393,186 | 7/1968 | Groves | 526/245 |
| 3,822,228 | 7/1974 | Petralla et al. | 526/245 |
| 4,100,340 | 7/1978 | Waldman et al. | 526/245 |
| 4,666,977 | 5/1987 | Kihara et al. | 526/245 |
| 4,681,925 | 7/1987 | Slepparola et al. | 526/246 |
| 4,735,990 | 4/1990 | Kihara et al. | 526/245 |

FOREIGN PATENT DOCUMENTS

| | | | |
|---|---|---|---|
| 2247111 | 9/1972 | Fed. Rep. of Germany | 526/245 |
| 0238311 | 11/1985 | Japan | 526/245 |

*Primary Examiner*—Paul R. Michl
*Assistant Examiner*—Peter Szekely
*Attorney, Agent, or Firm*—Breiner & Breiner

[57] ABSTRACT

Acrylate copolymers containing amino, hydroxyl and fluorine groups useful as additives for aqueous cationic coating systems for preventing surface flaws and for improving the adhesion of further coats, in particular of PVC-containing coating materials, are described. In addition to amino groups which can be neutralized with acids, the acrylate copolymers contain a selected quantity of hydroxyl groups originating from monoesters of (meth)acrylic acid with diols, and fluorine from esters of (meth)acrylic acid. The additives are added in a quantity from 0.5 to 5.0% by weight, calculated on solids and relative to the solids content of the binder in a coating system.

6 Claims, No Drawings

ACRYLATE COPOLYMER ADDITIVES FOR AQUEOUS CATIONIC COATING SYSTEMS

FIELD OF INVENTION

The present invention relates to the use of acrylate copolymers containing hydroxyl groups and fluorine as additives for aqueous cationic coating systems. More particularly, the invention relates to electro-dip primers containing acrylate copolymers containing hydroxyl groups and fluorine which can be cathodically deposited. The additives prevent surface flaws and improve the adhesion of further coats, in particular of PVC-containing coating materials.

BACKGROUND OF INVENTION

Aqueous systems during film formation show increased sensitivity to foreign substances in the coating material or on the substrate which is to be coated, which sensitivity manifests itself in the form of craters, dents, or similar surface flaws. In primers, this sensitivity can in some cases be avoided or at least diminished by increasing the pigment content. Very frequently, however, particularly in the case of decorative coatings, this approach is not feasible since it leads to a reduction in the durability properties or to deterioration in the optical properties. Moreover, in electro-dip priming an increase in the pigment/binder ratio is possible only to a very limited extent for process engineering reasons.

A reduction in the sensitivity of aqueous coating systems to surface flaws can also be effected by addition of surface-active substances. In this case, an enrichment of the additives in the region of the coating surface occurs due to excessive incompatibility of the additives with the coating material which causes a substantial deterioration in the intercoat adhesion, that is to say the adhesion of further coats, in particular those based on vinyl chloride (co)polymers. As is known, PVC-based coatings are used on a large scale as underseals in the motor vehicle industry and are applied over the entire area of the cathodically deposited primer. To achieve the required stoneguard protection, the interlayer adhesion in these coating layers is of decisive importance.

To avoid extreme incompatibility, polymeric additives which are copolymers of acidic monomers and neutral ester monomers, mainly of (meth)acrylic monomers, are currently used for anionic coatings based on water-soluble paint binders carrying carboxylate groups. By appropriate matching of the acid fraction, optimum effectiveness can be achieved in these systems; but even in such systems there is high sensitivity to over-addition which immediately leads to the adhesion difficulties above described.

Austrian Patent Nos. 382,385; 383,137, and 382,630 disclose binders which can be deposited cathodically and which provide improved PVC adhesion due to their specific molecular structure. The avoidance of surface flaws is not observable in these products.

It is known to employ fluorine-containing monomeric compounds in the preparation of aqueous polymer dispersions which are primarily used for textile coating. Most of the fluorine-containing coating agents known from the literature are dispersions of tetrafluoroethylene polymers with special emulsifiers or special film-forming additives being employed. See, for example, JP 48/17545A; DE 2,837,107A; DE 3,403,880A; DE 3,533,807A; EP 173,071A, or EP 193,963. In EP-A2-0,293,963 reactive wetting agents containing fluorohydrocarbon radicals are described.

SUMMARY OF INVENTION

It has now been found that in cationic coating systems, especially in electro-dip primers which can be deposited cathodically, the above-mentioned surface flaws and adhesion difficulties can be overcome if acrylate copolymers which are built-up from monomers containing protonatable N-basic groups, monoesters of (meth)acrylic acid with diols, (meth)acrylates, fluorine-containing esters of (meth)acrylic acid, and optionally styrene are used as additives.

Accordingly, the present invention relates to the use of cationic acrylate copolymers which contain hydroxyl groups and fluorine and which are made up of (A) from 5 to 40% by weight of acrylic monomers having secondary or tertiary amino groups, (B) from 5 to 50% by weight of monoesters of (meth)acrylic acid with diols having alkylene radicals having 2 to 6 carbon atoms or oxyalkylene radicals having 4 to 12 carbon atoms in total, (C) from 15 to 89.5% by weight of alkyl (meth)acrylates with alkyl radicals having 1 to 12 carbon atoms, (D) from 0.5 to 10% by weight of fluorine-containing esters of (meth)acrylic acid, and, optionally, (E) up to 10% by weight of styrene, wherein the total of the percentage figures of the components (A) to (E) must be 100, and wherein the copolymers have an amine number of from 15 to 150 mg KOH/g, preferably from 30 to 120 mg KOH/g; and a hydroxyl number of from 15 to 250 mg KOH/g, preferably from 20 to 200 mg KOH/g; and whose protonatable groups can be neutralized to the extent of at least 50% with an organic acid, preferably a lower carboxylic acid or hydroxy carboxylic acid, as additives for aqueous cationic coating systems for preventing surface flaws and for improving the adhesion of further coats, in particular of PVC-containing coating materials. As a result of the use of the additives according to the present invention, both film flaws, which are caused by the surface tension of the aqueous phase in the paint, and the problems in intercoat adhesion, that is to say in the adhesion of further coats, in particular in the case of PVC-containing coating materials as the further coat, are substantially reduced.

The acrylate copolymers of this invention are prepared in a conventional manner by solution polymerization in water-miscible or at least water-tolerant solvents, such as lower alcohols, preferably butanol or glycol mono- or diethers. Mixtures of these solvents, for example butanol with methoxypropanol, can also be used.

The acrylate copolymers are characterized by the following parameters:

amine number: 15 to 150 mg KOH/g, preferably 30 to 120 mg KOH/g, and hydroxyl number: 15 to 250 mg KOH/g, preferably 20 to 200 mg KOH/g.

The basic acrylic monomers employed as component A have secondary or tertiary amino groups. The monoalkylaminoalkyl or dialkylaminoalkyl (meth)acrylates, in particular N,N-dimethylaminoethyl-, N,N-diethylaminoethyl- or N,N-dipropylaminoethyl (meth)acrylate or N-tert.-butylaminoethyl (meth)acrylate, are a preferred group of such monomers. In place of these ester monomers, corresponding reaction products of glycidyl (meth)acrylate and secondary alkylamines or alkanolamines can also be used. The secondary or tertiary amino groups are introduced preferably by subsequent polymer-analogous reaction of the glycidyl groups of an appropriate copolymer with primary or preferably secondary amines.

The fluorine-containing monomers used as component D preferably are the 2-perfluoroalkylethyl esters of (meth)acrylic acid. Compounds of the general formula $$C_nF_{2n+1}(CH_2)_2OOC.CR=CH_2,$$

where n=4-14 and R is a hydrogen atom or a methyl group, are available commercially as a mixture of (meth)acrylic acid esters which contains more than 50% of 2-(perfluorooctyl)ethyl (meth)acrylate (corresponding to heptadecafluorodecyl (meth)acrylate, n=8). A further monomer from this group is pentafluorobutyl methacrylate (n=2). Monomer components B, C, and E used in the copolymers of this invention are readily known and available.

The basic groups of the acrylate copolymers of this invention are neutralized to the extent of at least 50% with an organic acid. Preferably, neutralization is carried out with a lower carboxylic acid or hydroxy carboxylic acid. Examples of such neutralizing agents are formic acid, acetic acid, or lactic acid. Simultaneously with the addition of the neutralizing agent or after the neutralization, the acrylate copolymers are diluted with water to a solids content advantageous for application. Usually the copolymers are used as a 50±15% solution.

The additives according to the invention are used in a quantity of from 0.5 to 5.0% by weight, preferably from 1.0 to 3.0% by weight, calculated on 100% solids content and relative to the solids content of the binder in the coating material.

The additives according to the present invention can be used for all types of coating materials which are formulated with cationic binders and which are water-dilutable, at times being described as "water-soluble." Such binders include condensation resins, copolymers of α,β-unsaturated monomers, or addition resins, such as modified epoxy resin esters. Usually, they carry a sufficient number of protonatable groups in order that the binder can be converted into a water-dilutable form by neutralization with acids. The additives according to the invention have proved to be particularly advantageous in electro-dip primers which can be deposited cathodically.

The additives according to the invention are advantageously tested by mixing small quantities of an interfering substance into the clearcoat, ready for application, of the binder. Styrene-modified or vinyltoluene-modified alkyd resins, dissolved in white spirits and/or other organic solvents, have proven to be particularly suitable for this test. The contaminated clearcoat is deposited on a degreased steel sheet and cured under the conditions required for the binder. The test for intercoat adhesion is carried out after the application of one or more further coat(s), such as a PVC coat, filler coat or topcoat, by assessing the total coat structure by means of the crosscut test, if desired after a corrosive stress.

The following examples illustrate the invention without restricting the scope thereof. All data in parts or percent relate to units per weight, unless otherwise stated.

EXAMPLES 1-11

Preparation of additives using alkylaminoethyl (meth)acrylate monomers

The preparation of the additives is carried out in the manner described below. The quantities of the raw materials used and the characteristics of the products are summarized in Table 1.

Part I is charged to the reaction vessel and heated to 85° C. Part II and Part III are added uniformly over the course of five hours at a temperature of 85°-90° C. After the end of the additions, the mixture is held for two hours at 90° C., and the end of the polymerization is checked by determining the solids content.

After the theoretical solids content has been reached, 100% of the amino groups are neutralized at 40° C. with a low-molecular weight organic acid, such as formic acid, acetic acid or lactic acid; and the product is diluted with deionized water to a solids content of 50%. The 50% strength additive solution obtained can be used directly.

Table 1 is as follows:

TABLE 1

| | Example | | | | | | | | | | |
|---|---|---|---|---|---|---|---|---|---|---|---|
| | 1 | 2 | 3 | 4 | 5 | 6 | 7 | 8 | 9 | 10 | 11 |
| Part I (Solvent) | | | | | | | | | | | |
| Methoxypropanol | 32.8 | 32.8 | 32.8 | — | — | 32.8 | — | 32.8 | 38.2 | — | 38.2 |
| Ethyleneglycol Monobutylether | — | — | — | 32.8 | 32.8 | — | 32.8 | — | — | 32.8 | — |
| Part II (Monomer Mixture) | | | | | | | | | | | |
| N,N-Dimethylaminoethyl methacrylate | 15 | 25 | — | — | 30 | — | 40 | — | 10 | — | 25 |
| N-t-Butylaminoethyl methacrylate | — | — | 30 | 15 | — | 25 | — | — | — | 30 | — |
| N,N-Dimethylaminoethyl acrylate | — | — | — | — | — | — | — | 20 | — | — | — |
| Hydroxyethyl methacrylate | 27 | 20 | — | — | — | 22 | — | 25 | — | 37 | — |
| Tripropylene glycol monomethacrylate | — | — | — | — | — | — | — | — | 25 | — | — |
| Hydroxyethyl acrylate | — | — | 30 | — | 22 | — | — | — | — | — | — |
| 4-Hydroxybutyl acrylate | — | — | — | — | — | — | 15 | — | — | — | — |
| 2-Hydroxypropyl methacrylate | — | — | — | 18 | — | — | — | — | — | 20 | 25 |
| n-Butyl acrylate | 55 | 25 | 37 | 30 | 35 | 35 | — | 40 | — | 30 | 20 |
| 2-Ethylhexyl | — | 20 | — | 35 | — | — | 42 | — | 38 | — | 29 |

TABLE 1-continued

| | Example | | | | | | | | | | |
|---|---|---|---|---|---|---|---|---|---|---|---|
| | 1 | 2 | 3 | 4 | 5 | 6 | 7 | 8 | 9 | 10 | 11 |
| acrylate | | | | | | | | | | | |
| Methyl methacrylate | — | — | — | — | — | — | — | 10 | 5 | — | — |
| Heptadecafluoro-decyl acrylate | 3 | 5 | 3 | 2 | 3 | 8 | 3 | 5 | 2 | — | 1 |
| Pentafluorobutyl methacrylate | — | — | — | — | — | — | — | — | — | 3 | — |
| Styrene | — | 5 | — | — | 10 | 10 | — | — | — | — | — |
| Part III (Catalyst Solution) | | | | | | | | | | | |
| Methoxypropanol | 10 | 10 | 10 | — | — | 10 | — | 10 | 10 | — | 10 |
| Ethyleneglycol monobutylester | — | — | — | 10 | 10 | — | 10 | — | — | 10 | — |
| Azobisiso-butyronitrile | 2 | 2 | 2 | 2 | 2 | 2 | 2 | 2 | 2 | 2 | 2 |
| Part IV (Neutralizing Agent) | | | | | | | | | | | |
| Formic acid | 4.4 | 7.3 | — | — | — | 6.2 | 11.7 | — | 2.9 | — | — |
| Acetic acid | — | — | 9.7 | 4.9 | — | — | — | 8.4 | — | — | 9.6 |
| Lactic acid | — | — | — | — | 17.2 | — | — | — | — | 14.6 | — |
| Part V (Dilution) | | | | | | | | | | | |
| Deionized water | 52.8 | 49.9 | 47.5 | 52.3 | 40.0 | 51.0 | 45.5 | 48.8 | 54.3 | 42.6 | 47.6 |
| Parameters | | | | | | | | | | | |
| Solids Content, % | 50 | 50 | 50 | 50 | 50 | 50 | 50 | 50 | 50 | 50 | 50 |
| Amine number mg KOH/g | 53.5 | 89.2 | 90.8 | 45.4 | 107.0 | 75.7 | 142.7 | 78.3 | 35.7 | 90.8 | 89.2 |
| Hydroxyl number mg KOH/g | 116.3 | 86.2 | 144.8 | 70.0 | 106.2 | 94.8 | 58.3 | 107.7 | 114.6 | 159.4 | 97.2 |

EXAMPLES 12 and 13

Preparation of the additives by polymer-analogous reaction of copolymers containing glycidyl groups with secondary alkylamines or alkanolamines The copolymers containing glycidyl groups are prepared in the same manner used in Examples 1-11. The amine solution (Part IIIa) is added at 80° C. over the course of thirty minutes. The temperature of the charge is then raised to 100° C. and held for a further ninety minutes to complete the reaction. The neutralization and dilution are carried out as in Examples 1-11.

The copolymers obtained have the composition as set forth in Table 2:

TABLE 2

| | Example | |
|---|---|---|
| | 12 | 13 |
| Part I | | |
| Methoxypropanol | 22.8 | 22.8 |
| Part II | | |
| Butyl acrylate | 46.3 | 29.9 |
| Glycidyl methacrylate | 20 | 20 |
| Hydroxyethylacrylate | — | 20 |
| Heptadecafluorodecyl acrylate | 3 | 3 |
| Styrene | 12 | 9 |
| Part III | | |
| Azobisisobutyronitrile | 2 | 2 |
| Methoxypropanol | 10 | 10 |
| Part IIIa | | |
| Methoxypropanol | 10 | 10 |
| Diisopropanolamine | 18.7 | — |
| Diisobutylamine | — | 18.1 |
| Part IV | | |
| Formic acid | 6.5 | 6.5 |
| Part V | | |
| Deionized water | 50.7 | 50.7 |
| Characteristics | | |
| Solids content, % | 50 | 50 |
| Amine number, mg KOH/g | 78.9 | 78.9 |
| Hydroxyl number, mg KOH/g | 157.5 | 96.6 |

Testing of the Additives According to the Invention

The additives are tested for their effectiveness in avoiding surface flaws during film formation of the coating materials, and for their effect on the adhesion of further coats, in particular those of PVC materials.

(a) Preparation of the Test Coats I and II

5% by weight, relative to resin solids, of a styrene- or vinyltoluene-modified alkyd resin in the form of a solution diluted to a solids content of 10% with ethylene glycol monobutylether/xylene (1:1) are added to 15% aqueous clearcoats I and II prepared as described in (b) below, and the whole is thoroughly mixed. A suitable alkyd resin is VIALKYD AV 462, supplied in the form of a 60% solution in white spirit by Vianova-Kunstharz, A.G., Austria, or an equivalent type.

(b) Preparation of the Clearcoats

Clearcoat I 500 parts of an epoxy resin based on bisphenol A and epichlorohydrin (epoxide equivalent weight about 500) are dissolved in 214 parts of propyleneglycol monomethylether, and the solution is reacted at 110° C. with 83 parts of a half-ester of phthalic anhydride and 2-ethylhexanol in the presence of 0.5 g of triethylamine as a catalyst to an acid number of less 3 mg KOH/g. 120 parts of an NH-functional oxazolidine prepared from aminoethylethanolamine, 2-ethylhexyl acrylate and formaldehyde; and 26 parts of diethylaminopropylamine are then added, and the batch is reacted at 80° C. to an epoxide value of virtually zero. The batch is diluted with 200 parts of propyleneglycol monomethylether.

70 parts, 100% resin solids, of this binder are combined with 30 parts, 100% resin solids, of a crosslinking component based on modified malonic esters, corresponding to Example 1 of Austrian Patent No. 379,602. After the addition of 1% of lead, calculated as the metal, in the form of lead octoate, and 40 millimoles of formic acid per 100 g of 100% resin solids, a 15% clearcoat is prepared with deionized water.

Clearcoat II 228 parts of bisphenol A (1 mole) are reacted with 260 parts of diethylaminopropylamine (2 moles) and 66 parts of 91% paraformaldehyde (2 moles) in the presence of 131 parts of toluene as an azeotropic entrainer until 42 parts of water of reaction have been separated off. After cooling to 30° C., 608 parts (2 moles) of a toluylene diisocyanate half-blocked with 2-ethylhexanol are added over the course of forty-five minutes. As soon as an NCO-value of virtually zero has been reached, the product is dissolved in 152 parts of diethyleneglycol dimethylether.

A solution of 190 parts of an epoxy resin based on bisphenol A and epichlorohydrin (epoxide equivalent weight about 190) and 250 parts (1 mole) of a glycidyl ether of a saturated, tertiary $C_9$-$C_{11}$-monocarboxylic acid in 389 parts of diethyleneglycol dimethylether is added to 1400 parts of the above solution, and the mixture is reacted at 95° to 100° C. to an epoxide value of zero. 0.6 parts (calculated as metal) per 100 g of resin solids of dibutyltin dilaurate as a catalyst are added to the product; and, after the addition of 40 millimoles of formic acid per 100 g of 100% resin solids, the mixture is diluted with deionized water to a solids content of 15%.

(c) Testing of the Additives According to the Invention

The test coats and mixtures set forth in Table 3 which follows are cathodically deposited on zinc-phosphated steel sheets and cured for thirty minutes at 180° C. The resulting dry film thickness is 25±5 μm. The film surface is evaluated with respect to the formation of craters or dents wherein 0=no craters; 1=isolated craters; 2=marked tendency to form craters, and 3=extensive formation of craters.

In order to test the adhesive strength of PVC materials on the cathodically deposited coat, a PVC coat is applied in the form of a 2 mm thick and 1 cm wide strip thirty minutes after the baking of the cathodic electrodip primer, and cured for seven minutes at 140° C. (object temperature). The adhesion is tested one hour after the baking for the susceptibility of the PVC coat to peeling wherein 1 means the film cannot be peeled off (the coating breaks without detaching from the substrate), down to 5 which means the film can be easily peeled off (inadequate adhesion).

The PVC materials used in the test were a commercially available underseal (US) (Stankiewicz 2252 made by Stankiewicz GmbH, Celle, Federal Republic of Germany), and a seam-sealing compound (SSC) used in the motor vehicle industry (Dekalin 9003 made by Dekalin, Deutsche Klebstoff-Werke, Hanau, Federal Republic of Germany).

TABLE 3

| Test Coat | Added Additive According to Example | % by weight | Cratering Rating | US Rating | SSC Rating |
|---|---|---|---|---|---|
| I | Without Additive | | 3 | 3 | 2 |
| I | 1 | 1 | 0 | 1 | 1 |
| | | 3 | 0 | 0–1 | 0–1 |
| I | 2 | 1 | 0 | 2 | 2 |
| | | 3 | 0 | 1–2 | 2 |
| I | 3 | 1 | 0–1 | 2 | 1–2 |
| | | 3 | 0 | 1–2 | 2 |
| I | 4 | 1 | 0 | 2 | 1–2 |
| | | 3 | 0 | 2 | 1 |
| I | 5 | 1 | 0 | 1–2 | 1 |
| | | 3 | 0 | 1 | 0–1 |
| I | 6 | 1 | 0–1 | 2 | 2 |
| | | 3 | 0 | 1–2 | 2 |
| I | 7 | 1 | 0–1 | 1 | 1–2 |
| | | 3 | 0 | 1 | 1 |
| I | 8 | 1 | 0 | 2 | 1–2 |
| | | 3 | 0 | 2 | 1 |
| I | 9 | 1 | 0–1 | 1 | 2 |
| | | 3 | 0 | 1 | 1 |
| I | 10 | 1 | 0 | 1–2 | 2 |
| | | 3 | 0 | 2 | 1–2 |
| I | 11 | 1 | 0–1 | 2 | 2 |
| | | 3 | 0 | 2 | 1–2 |
| I | 12 | 1 | 0–1 | 2 | 2 |
| | | 3 | 0 | 1 | 1 |
| I | 13 | 1 | 0–1 | 2 | 1–2 |
| | | 3 | 0 | 1–2 | 2 |
| II | Without Additive | | 2–3 | 2 | 2 |
| II | 1 | 1 | 0 | 1 | 1–2 |
| | | 3 | 0 | 1 | 1 |
| II | 2 | 1 | 0 | 1–2 | 1–2 |
| | | 3 | 0 | 1–2 | 1 |
| II | 3 | 1 | 0 | 2 | 2 |
| | | 3 | 0 | 2 | 2 |
| II | 4 | 1 | 0 | 1–2 | 1–2 |
| | | 3 | 0 | 2 | 1 |
| II | 5 | 1 | 0 | 1 | 1 |
| | | 3 | 0 | 1 | 0–1 |
| II | 6 | 1 | 0 | 2 | 1–2 |
| | | 3 | 0 | 2 | 2 |
| II | 7 | 1 | 1 | 1 | 2 |
| | | 3 | 0–1 | 0–1 | 2 |
| II | 8 | 1 | 0 | 1–2 | 1 |
| | | 3 | 0 | 1–2 | 1 |
| II | 9 | 1 | 0 | 1–2 | 1–2 |
| | | 3 | 0 | 1 | 1 |
| II | 10 | 1 | 0 | 1–2 | 2 |
| | | 3 | 0 | 1 | 2 |
| II | 11 | 1 | 0 | 2–3 | 2 |
| | | 3 | 0 | 2 | 2 |
| II | 12 | 1 | 1 | 2 | 2 |
| | | 3 | 0 | 2 | 1–2 |
| II | 13 | 1 | 0 | 2 | 2 |
| | | 3 | 0 | 1–2 | 2 |

As will be apparent to one skilled in the art, various modifications can be made within the scope of the aforesaid description. Such modifications being within the ability of one skilled in the art form a part of the present invention and are embraced by the appended claims.

It is claimed:

1. Cationic acrylate copolymers having hydroxyl and fluorine groups derived from
   (A) 5 to 40% by weight of acrylic monomers having secondary or tertiary amino groups,
   (B) 5 to 50% by weight of monoesters of (meth)acrylic acid and diols having alkylene radicals with from 2 to 6 carbon atoms or oxyalkylene radicals having 4 to 12 carbon atoms in total,
   (C) 15 to 89.5% by weight of alkyl (meth)acrylates having alkyl radicals with from 1 to 12 carbon atoms,
   (D) 0.5 to 10% by weight of fluorine-containing esters of (meth)acrylic acid,
   and,
   (E) up to 10% by weight of styrene,
wherein the total of the percentage figures of monomer components (A) to (E) must be 100, and said copolymers have an amine number from 15 to 150 mg KOH/g, and a hydroxyl number from 15 to 250 mg KOH/g, and contain protonatable groups which can be neutralized to the extent of at least 50% with an organic acid.

2. The copolymers of claim 1 wherein said copolymers have an amine value of from 30 to 120 mg KOH/g and a hydroxyl number of from 20 to 200 mg KOH/g.

3. A cationic coating system comprising a binder and a cationic acrylate copolymer having hydroxyl and fluorine groups derived from
 (A) 5 to 40% by weight of acrylic monomers having secondary or tertiary amino groups,
 (B) 5 to 50% by weight of monoesters of (meth)acrylic acid and diols having alkylene radicals with from 2 to 6 carbon atoms or oxyalkylene radicals having 4 to 12 carbon atoms in total,
 (C) 15 to 89.5% by weight of alkyl (meth)acrylates having alkyl radicals with from 1 to 12 carbon atoms,
 (D) 0.5 to 10% by weight of fluorine-containing esters of (meth)acrylic acid,
 and,
 (E) up to 10% by weight of styrene,
wherein the total of the percentage figures of monomer components (A) to (E) must be 100, and said copolymers have an amine number from 15 to 150 mg KOH/g, and a hydroxyl number from 15 to 250 mg KOH/g, and contain protonatable groups which can be neutralized to the extent of at least 50% with an organic acid.

4. The coating system of claim 3 wherein said copolymers have an amine value of from 30 to 120 mg KOH/g and a hydroxyl number of from 20 to 200 mg KOH/g.

5. The coating system of claim 3 wherein said copolymer is present in an amount of from 0.5 to 5.0% by weight calculated on solids and relative to the solids content of the binder in the coating system.

6. The coating system of claim 3 wherein said copolymer is present in an amount of from 1.0 to 3.0% by weight calculated on solids and relative to the solids content of the binder in the coating system.

* * * * *